United States Patent
Gupta et al.

(10) Patent No.: US 11,567,850 B2
(45) Date of Patent: Jan. 31, 2023

(54) DETECTING APPLICATION EVENTS BASED ON ENCODING APPLICATION LOG VALUES

(71) Applicant: salesforce.com, inc., San Francisco, CA (US)

(72) Inventors: Ankur Gupta, San Francisco, CA (US); Anuj Gargeya Malkapuram, Union City, CA (US)

(73) Assignee: Salesforce, Inc., San Francisco, CA (US)

( * ) Notice: Subject to any disclaimer, the term of this patent is extended or adjusted under 35 U.S.C. 154(b) by 670 days.

(21) Appl. No.: 16/589,430

(22) Filed: Oct. 1, 2019

(65) Prior Publication Data

US 2021/0097385 A1    Apr. 1, 2021

(51) Int. Cl.

| | | |
|---|---|---|
| *G06F 11/00* | (2006.01) | |
| *G06F 11/30* | (2006.01) | |
| *G06N 3/08* | (2006.01) | |
| *G06N 3/04* | (2006.01) | |
| *G06F 11/34* | (2006.01) | |
| *G06F 11/07* | (2006.01) | |

(52) U.S. Cl.
CPC ...... *G06F 11/3068* (2013.01); *G06F 11/0775* (2013.01); *G06F 11/302* (2013.01); *G06F 11/3476* (2013.01); *G06N 3/04* (2013.01); *G06N 3/08* (2013.01)

(58) Field of Classification Search
CPC ............. G06F 11/3068; G06F 11/0775; G06F 11/302; G06F 11/3476; G06N 20/00; G06N 3/04; G06N 3/08
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |

(Continued)

*Primary Examiner* — Joseph D Manoskey

(74) *Attorney, Agent, or Firm* — Dergosits & Noah LLP; Todd A. Noah

(57) ABSTRACT

An encoder receives an application log file including component values and encodes the component values into lists of preliminary encoded values. The lists of preliminary encoded values are combined into a combined list of preliminary encoded values. An encoder-decoder neural network is trained to encode the combined list of preliminary encoded values into a list of collectively encoded values, to decode the list of collectively encoded values into a list of decoded values, and to optimize a metric measuring the encoder-decoder neural network's functioning, in response to receiving the combined list of preliminary encoded values. The trained encoder-decoder neural network receives combined lists of preliminary encoded values for application log files and encodes the combined lists of preliminary encoded values into lists of collectively encoded values. The lists of collectively encoded values are sent to a detector, thereby enabling the detector to detect an application event associated with the application log files.

20 Claims, 5 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2017/0249200 A1* | 8/2017 | Mustafi ............... G06F 11/0709 |
| 2020/0076841 A1* | 3/2020 | Hajimirsadeghi ... G06N 3/0454 |
| 2020/0250477 A1* | 8/2020 | Barthur .................. G06N 20/00 |
| 2020/0364585 A1* | 11/2020 | Chan ...................... G06N 5/04 |
| 2021/0026722 A1* | 1/2021 | Bhatia .................... G06N 3/088 |

* cited by examiner

DETECTING APPLICATION EVENTS BASED ON ENCODING APPLICATION LOG VALUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A computing system can serve multiple users by executing software applications. An application event can be when a system user utilizes an computer program, such as logins to and logouts from an application, page requests/loads/views, record accesses, file and report downloads and exports, clicks on the application's user interface button, and uses of corresponding application programming interfaces (APIs). The system can respond to such application events by generating data that is saved in application log files. For example, if a user's client device downloads a file, a system logger stores a corresponding log entry in an application log file. The log file entry can include data such as a user identifier, a download event type, a timestamp when the download occurred, the name of the downloaded file, and internal system information, such as the bandwidth used by the system to provide the download. If another client of another user logs into the application, the logger can store a new log entry in an application log file. For example, if another client logs into the same application, the logger stores a new log entry in the same application log file or in another application log file. The new log entry can include data such as the user identifier, a login event type, a geographic location from which the other client logged into the application, a timestamp when the login occurred, and internal system information, such as a server load associated with the login.

If an application generates large volumes of application log files, such as hundreds of terabytes per day, a machine-learning system may be required to process such a large volume of application log files to detect specific system activities, such as a digital attacks and data theft, or to debug problems, such as performance glitches. A machine learning system needs to have application log files converted from their original characters-based format into a numerical format to understand the application log files. Table 1 below depicts example data stored by an application log file. The component names may or may not be stored in the application log file.

TABLE 1

Example data stored in an application log file

| Component | Value |
| --- | --- |
| eventId | a80e749ac |
| userId | 12345 |
| orgId | 34567 |
| loginToken | 378abc45d |
| browserId | 8930abedd40 |
| ipAddress | 1.1.1.1 |
| timestamp | 2019-07-04T17:18:27.637+00:00 |
| platform | MacIntel |
| userAgent | Mozilla/5.0 (Windows NT 6.1; Win64; x64; rv: 47.0) Gecko/20100101 Firefox/47.0 |
| cpuClass | x86 |
| languages | en, en-US, en-GB |
| window | 650 × 1040 |
| screen | 900 × 1440 |
| color | 24-24 |

There are many simple methods to convert such character values into numbers. However, these currently available simple methods are systemically incapable of providing a sufficient result because the quality of their conversions is inadequate for the optimal performance provided by machine-learning systems.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
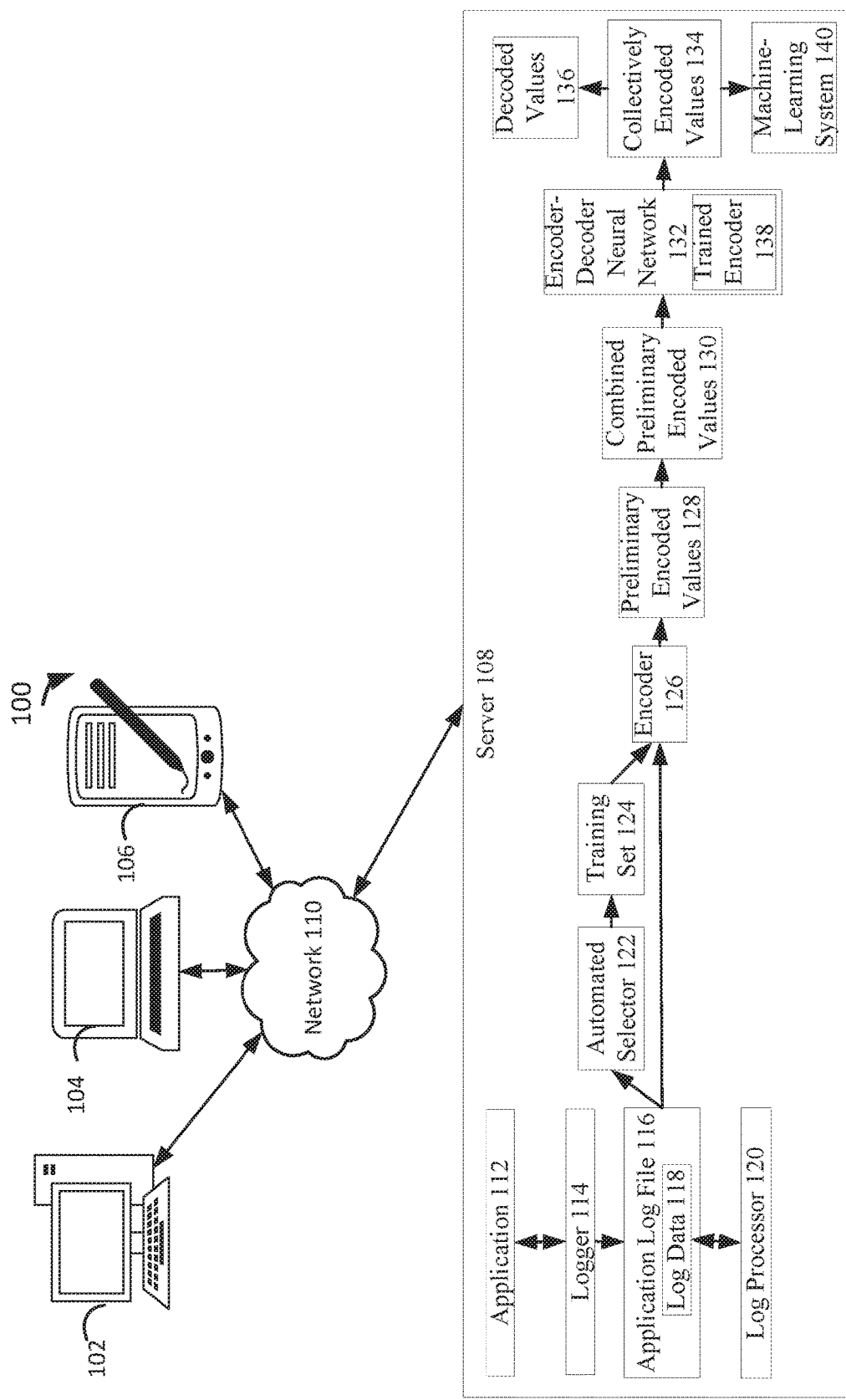
FIG. 1 illustrates an example system for detecting application events based on encoding application log values, in an embodiment.

In accordance with embodiments described herein, there are provided systems and methods for detecting application events based on encoding application log values. An encoder receives an application log file that includes component values and encodes the component values into lists of preliminary encoded values. The lists of preliminary encoded values are combined into a combined list of preliminary encoded values. An encoder-decoder neural network is trained to encode the combined list of preliminary encoded values into a list of collectively encoded values, to decode the list of collectively encoded values into a list of decoded values, and to optimize a metric measuring a function of the encoder-decoder neural network, in response to receiving the combined list of preliminary encoded values. The trained encoder-decoder neural network receives combined lists of preliminary encoded values for application log files and encodes the combined lists of preliminary encoded values into lists of collectively encoded values. The lists of collectively encoded values are sent to a detector, thereby enabling the detector to detect an application event associated with the application log files, For example, an encoder receives an application log file that includes the platform component value "MacIntel" and the CPU class component value "x86," and encodes "MacIntel" into [1, 0, 0] and "x86" into [0, 1]. The preliminary encoded values . . . [1, 0, 0] . . . [0, 1] . . . are combined into the combined preliminary encoded values [1, 0, 0, . . . 0, 1, . . . ]. After receiving the combined preliminary encoded values [1, 0, 0, . . . 0, 1, . . . ], an encoder-decoder neural network trains to encode the combined preliminary encoded values [1, 0, 0, . . . 0, 1, . . . ] into the collectively encoded values [ . . . 0.73, 0.26, 0.02, . . . 0.95, 0.13, . . . ], and to decode the collectively encoded values [ . . . 0.73, 0.26, 0.02, . . . 0.95, 0.13, . . . ] into the decoded values [1, 0, 0, . . . 0, 1, . . . ]. When the reconstruction error for encoding and decoding multiple application log files is optimized, the encoder-decoder neural network has been trained sufficiently. Therefore, the trained encoder-decoder neural network receives combined preliminary encoded values for application log files that were generated for a specific user and encodes the combined preliminary encoded values for the specific user into the collectively encoded values for the specific user. The collectively encoded values for the specific user are sent to a machine-learning system, which clusters the collectively encoded values for the specific user, detects an outlier in the clustered values for the specific user, and uses the distance between the outlier and the cluster along with the corresponding application log file to calculate a probability that a fraudulent user posed as the specific user and committed data theft.

While one or more implementations and techniques are described with reference to an embodiment in which detecting application events based on encoding application log values is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Systems and methods are provided for detecting application events based on encoding application log values. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Systems and methods for detecting application events based on encoding application log values will be described with reference to example embodiments. The following detailed description will first briefly describe overviews of systems for detecting application events based on encoding application log values.

FIG. 1 depicts an example of a system for detecting application events based on encoding application log values, in an embodiment. As shown in FIG. 1, a system 100 may illustrate a cloud computing environment in which data, applications, services, and other resources are stored and delivered through shared data centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108, that may be provided by a hosting company. Although FIG. 1 depicts the first client 102 as a desktop computer 102, the second client 104 as a laptop computer 104, and the third client 106 as a mobile phone 106, each of the clients 102-106 may be any type of computer. The clients 102-106 and the server 108 communicate via a network 110. Although FIG. 1 depicts the system 100 with three clients 102-106, one server 108, and one network 110, the system 100 may include any number of clients 102-106, any number of servers 108, and any number of networks 110. The clients 102-106 and the server 108 may be substantially similar to the systems depicted in FIGS. 4-5 and described below.

The system 100 includes an application 112, a logger 114, application log files 116, log data 118, and a log processor 120. The system 100 executes the application 112, the logger 114 generates application log files 116 that include the log data 118 for the application 112, and the log processor 120 outputs the log data 118 from the application log files 116 to the clients 102-106.

The system 100 also includes an automated selector 122, a training set 124, an encoder 126, preliminary encoded values 128, combined preliminary encoded values 130, an encoder-decoder neural network 132, collectively encoded values 134, decoded values 136, a trained encoder 138, and a machine-learning system 140. The following paragraphs will provide a brief overview of the operations of the elements 122-140, and then provide a detailed description of the operations of the elements 122-140.

The automated selector 122 can select any number of the application log files 116 to create the training set 124 that includes the selected application log files. The encoder 126 converts component values in an application log file in the training set 124 into preliminary encoded values 128. The system 100 combines preliminary encoded values 128 for the application log file into combined preliminary encoded values 130. The automated selector 122 can select a suitable objective function to optimize the encoder-decoder neural network 132. The system 100 trains the encoder-decoder neural network 132 to encode the combined preliminary encoded values 130 into collectively encoded values 134, which may be referred to as an application log embedding, and to decode the collectively encoded values 134 into decoded values 136. An embedding can be a particular type of numerical vector that is generated by a neural network. An application log embedding can be the specific type of numerical vector that is generated by a neural network to represent an application log file.

The system 100 continues providing combined preliminary encoded values 130 to train the encoder-decoder neural network 132 until the selected objective function is optimized, which indicates that the encoder-decoder neural network 132 has been trained sufficiently. The trained encoder-decoder neural network 132 uses its trained encoder 138 to encode combined preliminary encoded values 130 for application log files 116 into collectively encoded values 134. The system 100 provides the collectively encoded values 134 to a detector, such as the machine-learning system 140 or a statistical method, to detect application events for application log files 116. Although FIG. 1 depicts the elements 112-140 as residing on the server 108, any combination of the elements 112-140 may reside partially on any combination of the server 108, on any other servers that are not depicted, and/or on the clients 102-106.

The system 100 generates the preliminary encoding of the component values in an application log file, such as the values depicted above in Table 1. The encoder 126 first generates component-level preliminary encodings, such as the preliminary encoded values 128, and then combines the component-level preliminary encodings to obtain an application log file-level preliminary encoding, such as the combined preliminary encoded values 130. The encoder 126 can generate a preliminary encoding of every component value in an application log file using one of many ways. A simple way to encode component values is to use one-hot encoding (or label encoding) which converts a string into a list of numbers, as depicted below in Table 2. This list of numbers may be referred to as a numerical vector. Although these example encodings of a component value are depicted as a list of numbers, in some embodiments an encoding of a component value may be a single number.

TABLE 2

Examples of simple component -level preliminary encodings for the platform component values

| Value for platform | Simple preliminary encoding |
| --- | --- |
| MacIntel | [1, 0, 0] |
| ARM | [0, 1, 0] |
| Win32 | [0, 0, 1] |

Figure 2A:
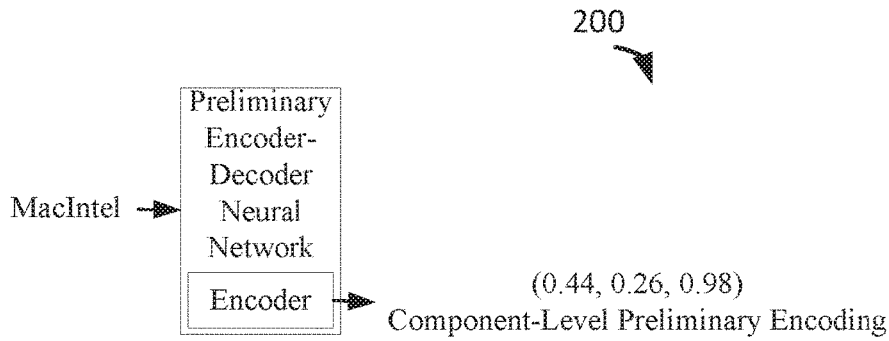
FIGS. 2A-2D illustrate example system elements for detecting application events based on encoding application log values, in an embodiment.

A complex alternative encoding uses individual component-level encodings generated by a preliminary encoder-decoder neural network. Such a neural network can take an individual component value of an application log file, such as the value for platform, as an input and return a numerical vector that corresponds to that component value only. FIG. 2A depicts this complex conversion. Table 3 depicts a sample result of the complex preliminary encoding, which is similar to the simple preliminary decoding depicted in Table 2. When a neural network is used as the method of preliminary encoding at the component level, the overall neural network becomes a hierarchical encoder-decoder neural network at the application log file level. Although these example encodings of component values are depicted as a list of numbers, in some embodiments an encoding of a component value may be a single number.

TABLE 3

Examples of complex component-level preliminary encoding for platform component values

| Value for platform | Complex preliminary encoding |
| --- | --- |
| MacIntel | [0.44, 0.26, 0.98] |
| ARM | [0.17, 0.96, 0.23] |
| Win32 | [0.75, 0.06, 0.85] |

Figure 2B:
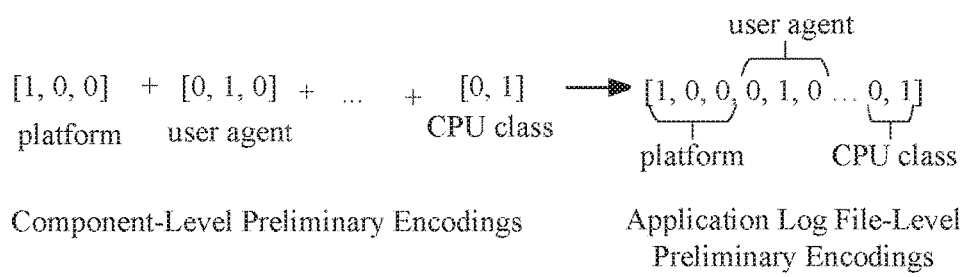

The preliminary encoding for each component value, which is the preliminary encoded values 128, is combined to produce an application log file-level preliminary encoding that is a list of numbers, which is the combined preliminary encoded values 130, as depicted in the FIG. 2B. The system 100 uses this list of numbers to train the encoder-decoder neural network 132 to obtain the collectively encoded values 134. The choice of the method to generate the preliminary encodings is arbitrary, such that one method may be used to generate the preliminary encodings during training and another method may be used to generate the preliminary encodings for detecting application events, such as digital attacks, data theft, and performance glitches.

In order to determine that the encoder-decoder neural network 132 is trained sufficiently, the encoder-decoder neural network 132 optimizes a metric, which may be referred to as the objective function. While the system 100 uses an objective function, the choice of the objective functions is arbitrary, as any objective function may be used for generating the collectively encoded values 134, which may be used for various tasks.

A simple choice of objective function is the reconstruction error. A reconstruction error function can be a metric that measures how well a neural network reconstructs its input. If the encoder-decoder neural network 132 successfully minimizes the reconstruction error to a suitable degree, then encoder-decoder neural network 132 has correctly interpreted the input that the encoder-decoder neural network 132 received.

A better objective function is a function that assesses how well the encoder-decoder neural network 132 is at performing a meaningful task. Such an objective function may be referred to as a meaningful objective function. One example of a meaningful objective functions is based on the system 100 reading two types of application log files—application log files generated at login (L-type) and application log files generated at report generation (R-type). The encoder-decoder neural network 132 tries to optimize the objective function by calculating a probability that correctly predicts whether or not a login was successful based on subsequent report generation activity. Essentially, a login was successful if an R-type report application log file for a user follows an L-type login application log file for the same user. If the encoder-decoder neural network 132 can calculate a probability that correctly predicts if a login was successful, then the encoder-decoder neural network 132 has both correctly interpreted the input (similar to the reconstruction error) as well as performed a meaningful task. Thus, in this sense, a meaningful objective function is better than the simple objective function described above as the reconstruction error.

An even better objective function would be a hybrid of the two objective functions described above. The hybrid objective function is a weighted average of the reconstruction error and the meaningful objective function, which enables the improvement in the quality of the collectively encoded values 134.

Figure 2C:
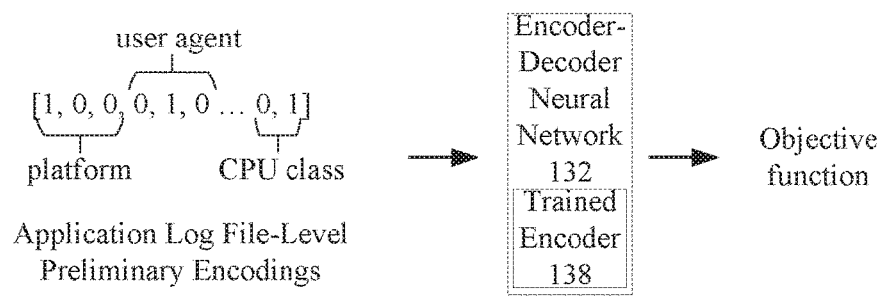

The encoder-decoder neural network 132 performs two steps. In the first step, the encoder-decoder neural network 132 encodes the received input into collectively encoded values 134. In the second step, the encoder-decoder neural network 132 decodes the collectively encoded values 134 into an output. The system 100 uses the application log level preliminary encoding, which are the combined preliminary encoded values 130, as an input to the encoder-decoder neural network 132. The system 100 uses the output of the encoder-decoder neural network 132 to compute the objective function. FIG. 2C depicts this this process that trains the encoder-decoder neural network 132 to optimize the selected objective function.

Figure 2D:
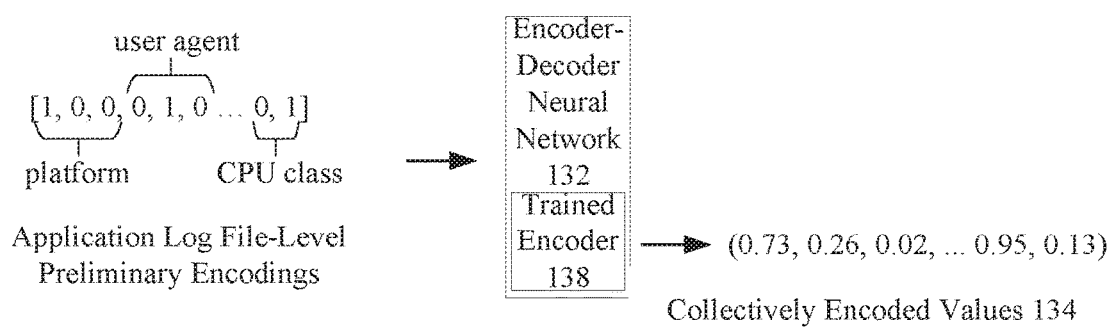

After the encoder-decoder neural network 132 is trained, the trained encoder 138 is the part of the encoder-decoder neural network 132 that is most important, such that the decoder part of the encoder-decoder neural network 132 may be discarded. FIG. 2D depicts that this trained encoder 138 can now generate the collectively encoded values 134 as its output.

The trained encoder 138 can generate the collectively encoded values 134 for all or some of the application log files 116. The system 100 uses these collectively encoded values 134 in the machine learning system 140 or a statistical model, which does not have to be a neural network, to detect application events, such as anomalies.

For example, the system 100 gathers the application log files for a particular user, converts each of the user's application log files into encoded application log values, and performs clustering on the encoded application log values to detect outliers. The outliers are the anomalies which may represent a digital attack, data theft, or a performance glitch.

Figure 3:
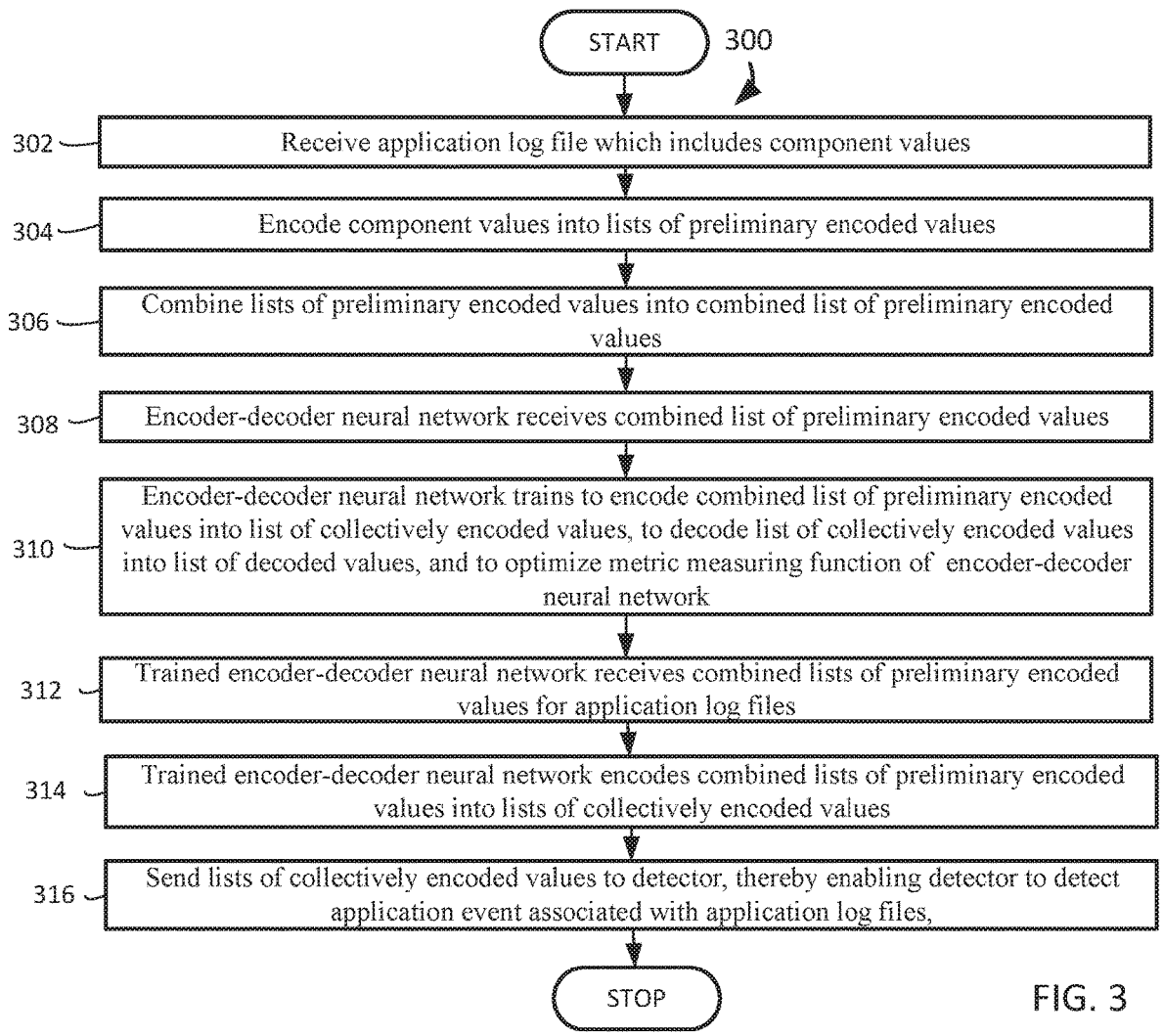
FIG. 3 is an operational flow diagram illustrating a high-level overview of a method for detecting application events based on encoding application log values, in an embodiment.

FIG. 3 is an operational flow diagram illustrating a high-level overview of a method 300 for detecting application events based on encoding application log values. An encoder receives an application log file that includes component values, block 302. The system receives an application log file that includes values which will be encoded based on each individual component and then encoded collectively. For example, and without limitation, this can include the encoder 126 receiving an application log file that includes stores the characters "MacIntel" in the component for platform and the characters "x86" in the component for CPU class.

An encoder can be a tool that converts information into a code. An application log file can be structure that stores records of events that occur in a computer program. A component value can be characters stored in a part of a record and which can represent an item of data. A character can be a symbol. A component can be a part of a record and can represent an item of data.

After receiving the application log file that includes component values, the encoder encodes the component values into lists of preliminary encoded values, block 304. The system individually encodes the values stored by an application log's components. By way of example and without limitation, this can include the encoder 126 encoding the characters "MacIntel" as the numbers [1, 0, 0] and the characters "x86" as the numbers [0, 1]. If the encoder 126 is an encoder-decoder neural network, then the characters "MacIntel" could be encoded as the numbers [0.44, 0.26, 0.98]. As demonstrated by these examples, the preliminary encoded values may include only numbers. The encoder 126 may encode the values for all of the application log component values, or only application log component values that have been pre-selected as relevant for training the encoder decoder neural network 132 to generate the collectively encoded values 134 which enable the detection of specific application events.

A list can be a collection of any number of items, which may include repetitive items. A preliminary encoded value can be information that has been initially converted into a code. An encoder-decoder neural network can be a computing system that learns to convert information into a code, and convert that code back to the original information, by considering examples, generally without being programmed with task-specific rules. A number can be an arithmetical value, expressed by a word, symbol, or figure, representing a particular quantity and used in counting and making calculations. Encoding can be a process of converting a value, such as characters and/or numbers, into a number that may be used in machine learning.

Following the preliminary encoding of component values, the lists of preliminary encoded values are combined into a combined list of preliminary encoded values, block 306. The system aggregates the results of the individual encodings of each of an application log's components. In embodiments, this can include the server 108 combining the lists of preliminary encoded values . . . [1, 0, 0] . . . [0, 1] . . . into the combined list of preliminary encoded values [1, 0, 0, . . . 0, 1, . . . ]. A combined list can be a collection of any number of distinct items that was created by merging other collections of any number of distinct items.

Having combined the lists of preliminary encoded values, an encoder-decoder neural network receives the combined list of preliminary encoded values, block 308. The system sends the combined list of the individually encoded values to be collectively encoded. For example, and without limitation, this can include the encoder-decoder neural network 130 receiving the combined list of preliminary encoded values [1, 0, 0, . . . 0, 1, . . . ].

After receiving a combined list of preliminary encoded values, an encoder-decoder neural network is trained to encode the combined list of preliminary encoded values into a list of collectively encoded values, to decode the list of collectively encoded values into a list of decoded values, and to optimize a metric measuring a function of the encoder-decoder neural network, block 310. The system collectively encodes a list of values that were encoded based on their individual components in an application log. By way of example and without limitation, this can include the encoder-decoder neural network 132 training to encode the combined list of preliminary encoded values [1, 0, 0, . . . 0, 1, . . . ] into the list of collectively encoded values [ . . . 0.73, 0.26, 0.02, . . . 0.95, 0.13, . . . ], to decode the list of collectively encoded values [ . . . 0.73, 0.26, 0.02, . . . 0.95, 0.13, . . . ] into the list of decoded values [1, 0, 0, . . . 0, 1, . . . ], and to optimize the reconstruction error. As demonstrated by this example, the collectively encoded values may include only numbers.

A collectively encoded value can be a list of information that has been converted together into a code. A decoded value can be code that has been converted into information. A metric can be a standard of measurement. A function can be a metric that represents how well a neural network is performing.

Consequently, the encoder-decoder neural network 132 performs a highly non-linear computation to generate high quality collectively encoded values for application log files, because the encoder-decoder neural network 132 collectively encodes values for multiple components in a single application log file. Furthermore, the encoder-decoder neural network 132 exploits the vastness of application log files, which may store hundreds of terabytes of data per day, because the more application log files that are available for training, the better the encoder-decoder neural network 132 will be trained to generate high quality collectively encoded values for application log files. In contrast, a typical encoder-decoder that is not a neural network would continue to encode values for application log files in the same way, no matter how many application log files were available for encoding.

Either the automated selector 122 or a human may select the function to be optimized for the encoder-decoder neural network from a list of objective functions. The function of the encoder-decoder neural network may be selected from functions that include a reconstruction error function. For example, if the encoder-decoder neural network 132 decoded the list of collectively encoded values [ . . . 0.73, 0.26, 0.02, . . . 0.95, 0.13, . . . ] into the list of decoded values [1, 0, 0, . . . 0, 1, . . . ], which was the same as the combined list of preliminary encoded values [1, 0, 0, . . . 0, 1, . . . ], then the reconstruction error was optimized for the corresponding application log file.

The function of the encoder-decoder neural network may be selected from objective functions that include a function that performs a task. Performing the task can include encoding an additional combined list of preliminary encoded values into an additional list of collectively encoded values in response to receiving the additional combined list of preliminary encoded values corresponding to an additional application log file, decoding the additional list of collectively encoded values into an additional list of decoded values, and comparing the list of decoded values against the additional list of decoded values. For example, the encoder-decoder neural network 132 encodes the combined preliminary encoded values for a login application log file and a report generation application log file into two lists of collectively encoded values, and decodes the two lists of collectively encoded values into the decoded values for the login application log file and the report generation application log file. Then the encoder-decoder neural network 132 compares the decoded values for the login application log file and the report generation application log file, and calculates an objective function value of 0.90, which is a 90% probability that a user's login was successful, because a report generation application log file for the user follows a login application log file for the same user. Since the objective function has a 90% probability of correctly determining that the user's login was successful, then the function that performs a task is optimized for the login and report generation application log files. A task can be a piece of work.

Training the encoder-decoder neural network may include the automated selector 122 selecting the application log file and the additional application log file, from a set of application log files, as a training set for the encoder-decoder. For example, the automated selector 122 selects a login application log file for a user and a report generation application log file for the same user from multiple application log files, and groups the two selected application log files to create a training set for the encoder-decoder neural network 132. Consequently, the system 100 performs a self-supervised computation to generate high quality collectively encoded values for application log files, because the system 100 requires no human intervention to create the training sets or to train the encoder-decoder neural network 132. In contrast, requiring a human to identify a login application log file for a user and a report generation application log file for the same user from hundreds of terabytes storing application log files, to group the two selected application log files to create a training set for the encoder-decoder neural network 132, and to label the training set as a training set in which the user's login was successful would be a highly inefficient use of system resources. An automated selector can be a tool that chooses something, without human intervention. A set can be a collection of any number of distinct items. A training set can be a collection of any number of distinct items that is used for teaching a particular skill.

The function of the encoder-decoder neural network may be selected from a hybrid function that includes the reconstruction error function and the function that performs the task. For example, the encoder-decoder neural network 132 encodes the combined preliminary encoded values for a login application log file and a report generation application log file into two lists of collectively encoded values, and decodes the two lists of collectively encoded values into the decoded values for the login application log file and the report generation application log file, and then a weight is applied to the optimized reconstruction error. Then the encoder-decoder neural network 132 compares the decoded values for the login application log file and the report generation application log file, and calculates an objective function value of 0.90, which is a 90% probability that a user's login was successful, because a report generation application log file for the user follows a login application log file for the same user. Since the objective function has a 90% probability of correctly predicting that a user's login was successful, the function that performs a task is optimized for the login and report generation application log files. Since the encoder-decoder neural network 132 correctly predicted the user's login was successful, the function to perform a task is also optimized and assigned a weight. Therefore, the hybrid function is optimized because the weighted average of the reconstruction error and the function that performs a task is optimized. A hybrid function can be a metric that is composed of two metrics which represent how well a neural network is performing.

Following the training that optimized the objective function, the trained encoder-decoder neural network receives combined lists of preliminary encoded values for application log files, box 312. The system receives individually encoded application log file component values to collectively encode based on the collective encoding training. In embodiments, this can include the trained encoder-decoder neural network 132 receiving the combined lists of preliminary encoded values for application log files that were generated for a specific user. A trained encoder-decoder neural network can be a computing system that has learned to convert information into a code, and convert that code back to the original information, by considering examples, generally without being programmed with task-specific rules.

Having received the combined lists of preliminary encoded values for application log files, the trained encoder-decoder neural network encodes the combined lists of preliminary encoded values into lists of collectively encoded values, box 314. The system collectively encodes application log component values based on the collective encoding training. For example, and without limitation, this can include the trained encoder 138 encoding the combined lists of preliminary encoded values for the specific user into lists of collectively encoded values for the specific user.

After creating lists of collectively encoded values, the lists of collectively encoded values are sent to a detector, thereby enabling the detector to detect an application event associated with the application log files, block 316. The system uses the collectively encoded application log component values to detect specific application events. By way of example and without limitation, this can include the server 108 sending the lists of collectively encoded values for the specific user to the machine-learning system 140, which clusters the lists of collectively encoded values for the specific user, and detects an outlier in the clustered values for the specific user. Whereas 89 of the 90 application log files recorded for the specific user over the last three months store an American internet protocol address, login times that are during normal business hours for the Pacific time zone, and a Firefox user agent, the application log file which corresponds to the outlier stores a Russian internet protocol address, login times that are around 2:00 A.M. for the Pacific time zone, and a Linux user agent. Consequently, the machine-learning system 140 calculates a probability that the outlier represents a potential fraudulent user posing as the legitimate user and possibly committing data theft.

The detector may be the machine-learning system 140 or a statistical model. A detector can be a tool that identifies the existence of items. A machine-learning system can be an artificial intelligence tool that has the ability to automatically learn and improve from experience without being explicitly programmed. A statistical model can be a mathematically formalized way to approximate reality. A user can be a person who operates a computer. An outlier can be an item which lies an abnormal distance from other items in a group of items. Clustering can be a task of grouping similar objects together.

The method 300 may be repeated as desired. Although this disclosure describes the blocks 302-316 executing in a particular order, the blocks 302-316 may be executed in a different order. In other implementations, each of the blocks 302-316 may also be executed in combination with other blocks and/or some blocks may be divided into a different set of blocks.

System Overview

Figure 4:
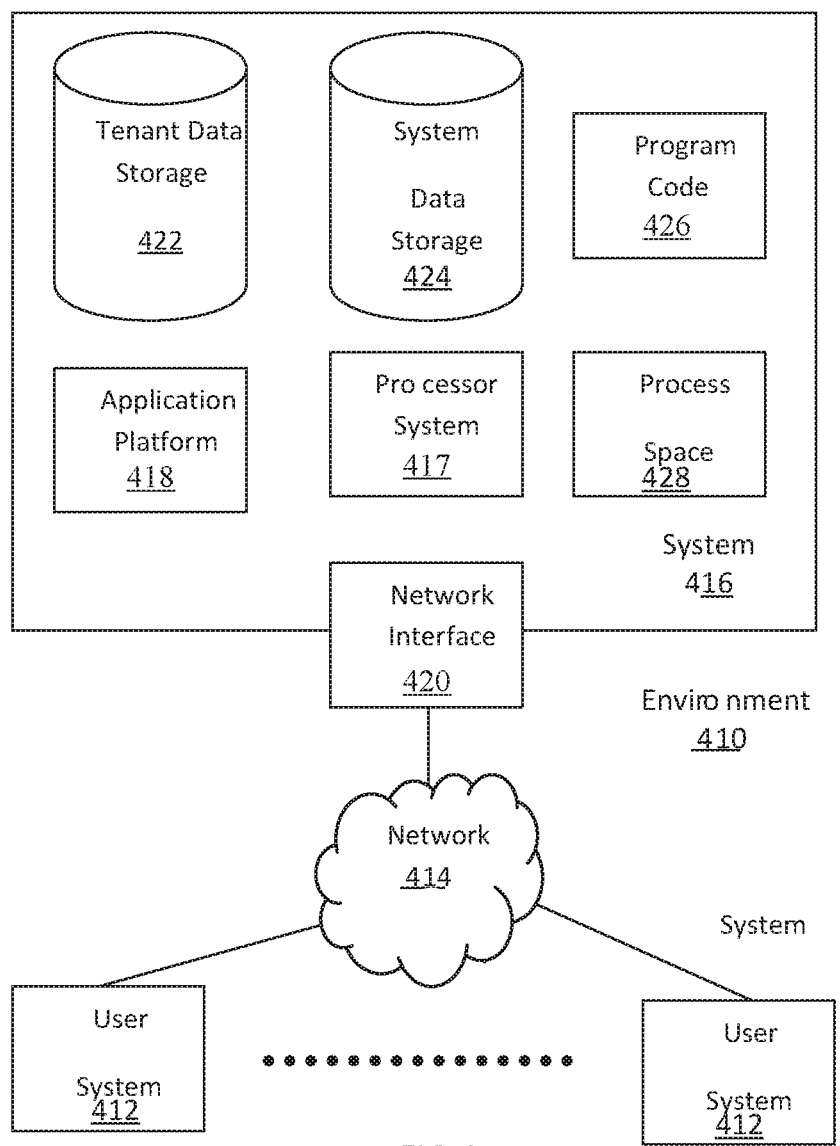
FIG. 4 illustrates a block diagram of an example of an environment wherein an on-demand database service might be used.

FIG. 4 illustrates a block diagram of an environment 410 wherein an on-demand database service might be used. The environment 410 may include user systems 412, a network 414, a system 416, a processor system 417, an application platform 418, a network interface 420, a tenant data storage 422, a system data storage 424, program code 426, and a process space 428. In other embodiments, the environment 410 may not have all of the components listed and/or may have other elements instead of, or in addition to, those listed above.

The environment 410 is an environment in which an on-demand database service exists. A user system 412 may be any machine or system that is used by a user to access a database user system. For example, any of the user systems 412 may be a handheld computing device, a mobile phone, a laptop computer, a work station, and/or a network of computing devices. As illustrated in FIG. 4 (and in more detail in FIG. 5) the user systems 412 might interact via the network 414 with an on-demand database service, which is the system 416.

An on-demand database service, such as the system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 416" and the "system 416" will be used interchangeably herein. A database image may include one or more database objects. A relational database management system (RDMS) or the equivalent may execute storage and retrieval of information against the database object(s). The application platform 418 may be a framework that allows the applications of the system 416 to run, such as the hardware and/or software, e.g., the operating system. In an embodiment, the on-demand database service 416 may include the application platform 418 which enables creation, managing and executing one or more applications developed by the provider of the on-demand database service, users accessing the on-demand database service via user systems 412, or third party application developers accessing the on-demand database service via the user systems 412.

The users of the user systems 412 may differ in their respective capacities, and the capacity of a particular user system 412 might be entirely determined by permissions (permission levels) for the current user. For example, where a salesperson is using a particular user system 412 to interact with the system 416, that user system 412 has the capacities allotted to that salesperson. However, while an administrator is using that user system 412 to interact with the system 416, that user system 412 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 414 is any network or combination of networks of devices that communicate with one another. For example, the network 414 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 412 might communicate with the system 416 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 416. Such an HTTP server might be implemented as the sole network interface between the system 416 and the network 414, but other techniques might be used as well or instead. In some implementations, the interface between the system 416 and the network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 416, shown in FIG. 4, implements a web-based customer relationship management (CRM) system. For example, in one embodiment, the system 416 includes application servers configured to implement and execute CRM software applications as well as provide related data, code, forms, webpages and other information to and from the user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 416 implements applications other than, or in addition to, a CRM application. For example, the system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of the system 416 is shown in FIG. 4, including the network interface 420, the application platform 418, the tenant data storage 422 for tenant data 423, the system data storage 424 for system data 425 accessible to the system 416 and possibly multiple tenants, the program code 426 for implementing various functions of the system 416, and the process space 428 for executing MTS system processes and tenant-specific processes, such as running applications as part of an application hosting service. Additional processes that may execute on the system 416 include database indexing processes.

Several elements in the system shown in FIG. 4 include conventional, well-known elements that are explained only briefly here. For example, each of the user systems 412 could include a desktop personal computer, workstation, laptop, PDA, cell phone, or any wireless access protocol (WAP) enabled device or any other computing device capable of interfacing directly or indirectly to the Internet or other network connection. Each of the user systems 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 412 to access, process and view information, pages and applications available to it from the system 416 over the network 414. Each of the user systems 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 416 or other systems or servers. For example, the user interface device may be used to access data and applications hosted by the system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 412 and all of its components are operator configurable using applications, such as a browser, including computer code run using a central processing unit such as an Intel Pentium® processor or the like. Similarly, the system 416 (and additional instances of an MTS, where more than one is present) and all of their components might be operator configurable using application(s) including computer code to run using a central processing unit such as the processor system 417, which may include an Intel Pentium® processor or the like, and/or multiple processor units. A computer program product embodiment includes a machine-readable storage medium (media) having instructions stored thereon/ in which may be used to program a computer to perform any of the processes of the embodiments described herein. Computer code for operating and configuring the system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/ IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 416 is configured to provide webpages, forms, applications, data and media content to the user (client) systems 412 to support the access by the user systems 412 as tenants of the system 416. As such, the system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 5:
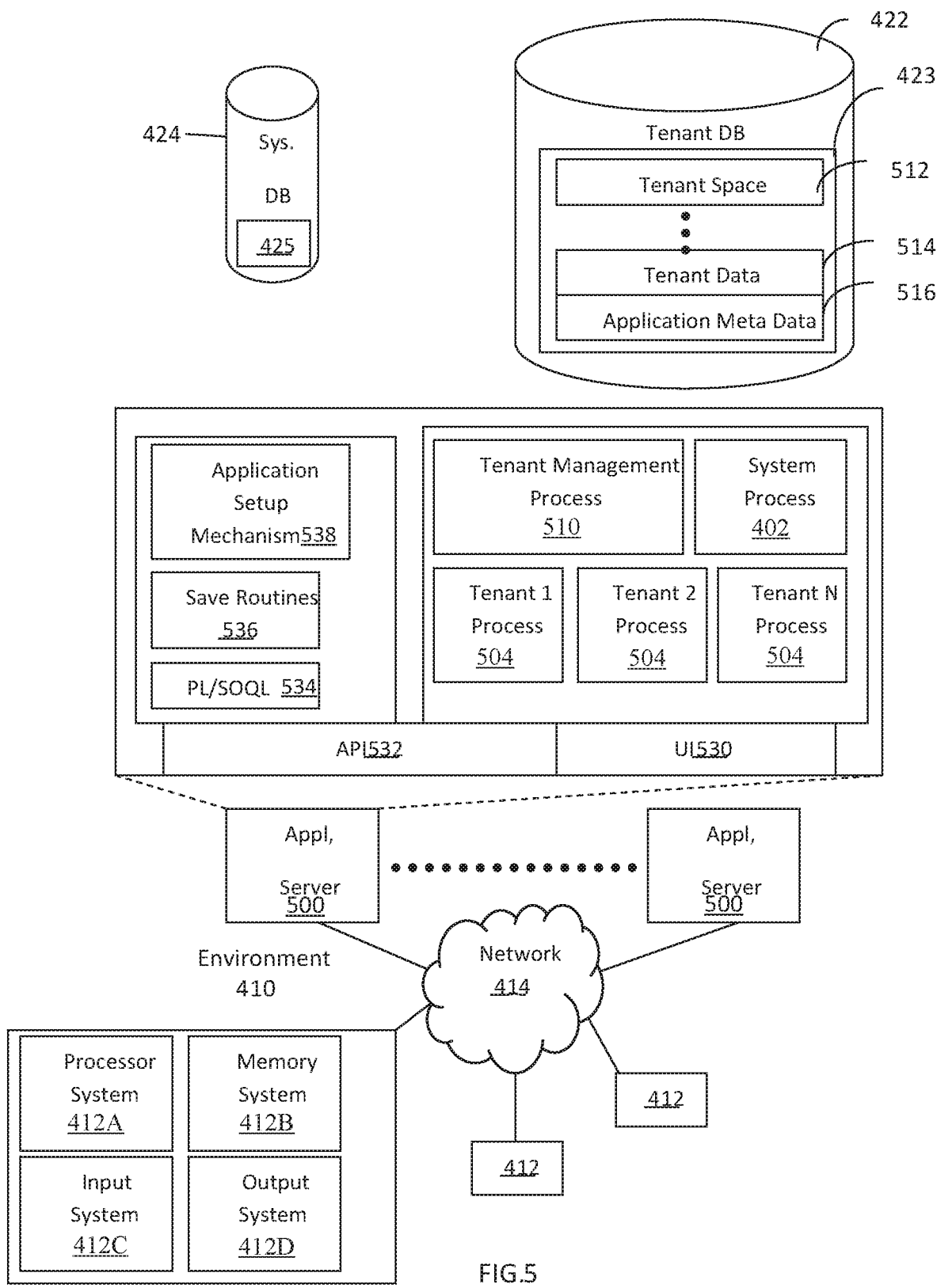
FIG. 5 illustrates a block diagram of an embodiment of elements of FIG. 4 and various possible interconnections between these elements.

FIG. 5 also illustrates the environment 410. However, in FIG. 5 elements of the system 416 and various interconnections in an embodiment are further illustrated. FIG. 5 shows that the each of the user systems 412 may include a processor system 412A, a memory system 412B, an input system 412C, and an output system 412D. FIG. 5 shows the network 414 and the system 416. FIG. 5 also shows that the system 416 may include the tenant data storage 422, the tenant data 423, the system data storage 424, the system data 425, a User Interface (UI) 530, an Application Program Interface (API) 532, a PL/SOQL 534, save routines 536, an application setup mechanism 538, applications servers $500_1$-$500_N$, a system process space 502, tenant process spaces 504, a tenant management process space 510, a tenant storage area 512, a user storage 514, and application metadata 516. In other embodiments, the environment 410 may not have the same elements as those listed above and/or may have other elements instead of, or in addition to, those listed above.

The user systems 412, the network 414, the system 416, the tenant data storage 422, and the system data storage 424 were discussed above in FIG. 4. Regarding the user systems 412, the processor system 412A may be any combination of one or more processors. The memory system 412B may be any combination of one or more memory devices, short term, and/or long term memory. The input system 412C may be any combination of input devices, such as one or more keyboards, mice, trackballs, scanners, cameras, and/or interfaces to networks. The output system 412D may be any combination of output devices, such as one or more monitors, printers, and/or interfaces to networks. As shown by FIG. 5, the system 416 may include the network interface 420 (of FIG. 4) implemented as a set of HTTP application servers 500, the application platform 418, the tenant data storage 422, and the system data storage 424. Also shown is the system process space 502, including individual tenant process spaces 504 and the tenant management process space 510. Each application server 500 may be configured to access tenant data storage 422 and the tenant data 423 therein, and the system data storage 424 and the system data 425 therein to serve requests of the user systems 412. The tenant data 423 might be divided into individual tenant storage areas 512, which may be either a physical arrangement and/or a logical arrangement of data. Within each tenant storage area 512, the user storage 514 and the application metadata 516 might be similarly allocated for each user. For example, a copy of a user's most recently used (MRU) items might be stored to the user storage 514. Similarly, a copy of MRU items for an entire organization that is a tenant might be stored to the tenant storage area 512. The UI 530 provides a user interface and the API 532 provides an application programmer interface to the system 416 resident processes to users and/or developers at the user systems 412. The tenant data and the system data may be stored in various databases, such as one or more Oracle™ databases.

The application platform 418 includes the application setup mechanism 538 that supports application developers' creation and management of applications, which may be saved as metadata into the tenant data storage 422 by the save routines 536 for execution by subscribers as one or more tenant process spaces 504 managed by the tenant management process 510 for example. Invocations to such applications may be coded using the PL/SOQL 534 that provides a programming language style interface extension to the API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 516 for the subscriber making the invocation and executing the metadata as an application in a virtual machine.

Each application server 500 may be communicably coupled to database systems, e.g., having access to the system data 425 and the tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also may be used. For example, in certain embodiments, three consecutive requests from the same user could hit three different application servers 500, and three requests from different users could hit the same application server 500. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage their sales process. Thus, a user might maintain contact data, leads data, customer follow-up data, performance data, goals and progress data, etc., all applicable to that user's personal sales process (e.g., in the tenant data storage 422). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 412 (which may be client systems) communicate with the application servers 500 to request and update system-level and tenant-level data from the system 416 that may require sending one or more queries to the tenant data storage 422 and/or the system data storage 424. The system 416 (e.g., an application server 500 in the system 416) automatically generates one or more SQL statements (e.g., one or more SQL queries) that are designed to access the desired information. The system data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for detecting application events based on encoding application log values, the system comprising:
   one or more processors; and
   a non-transitory computer readable medium storing a plurality of instructions, which when executed, cause the one or more processors to:
   encode, by an encoder, a plurality of component values into a corresponding plurality of lists of preliminary encoded values, in response to receiving an application log file comprising the plurality of component values;
   create a combined list of preliminary encoded values by combining the corresponding plurality of lists of preliminary encoded values;
   train an encoder-decoder neural network to encode the combined list of preliminary encoded values into a list of collectively encoded values, to decode the list of collectively encoded values into a list of decoded values, and to optimize a metric that measures a function of the encoder-decoder neural network, in response to receiving the combined list of preliminary encoded values;
   encode, by the trained encoder-decoder neural network, a plurality of combined lists of preliminary encoded values into a plurality of lists of collectively encoded values, in response to receiving the plurality of combined lists of preliminary encoded values corresponding to a plurality of application log files; and
   enable a detector to detect an application event associated with the plurality of application log files by sending the plurality of lists of collectively encoded values to the detector.

2. The system of claim 1, wherein the plurality of component values comprises a plurality of characters corresponding to a plurality of components associated with the application log file, and the encoder comprises an encoder-decoder neural network.

3. The system of claim 1, wherein the function is selected from at least one of a reconstruction error function, a function that performs a task, and a hybrid function comprising the reconstruction error function and the function that performs the task.

4. The system of claim 3, wherein performing the task comprises encoding an additional combined list of preliminary encoded values into an additional list of collectively encoded values in response to receiving the additional combined list of preliminary encoded values corresponding to an additional application log file, decoding the additional list of collectively encoded values into an additional list of decoded values, and optimizing the metric that measures the function of the encoder-decoder neural network comprises comparing the list of decoded values against the additional list of decoded values.

5. The system of claim 4, wherein training the encoder-decoder neural network comprises an automated selector selecting the application log file and the additional application log file, from a set of application log files, as a training set for the encoder-decoder.

6. The system of claim 1, wherein the preliminary encoded values comprise only numbers and the collectively encoded values comprise only numbers.

7. The system of claim 1, wherein the detector comprises one of a machine-learning system and a statistical model, the plurality of lists of collectively encoded values sent to the detector is associated with a user, and detecting the application event comprises detecting an outlier of the plurality of lists of collectively encoded values associated with the user based on clustering the plurality of lists of collectively encoded values associated with the user.

8. A computer program product comprising a non-transitory computer-readable medium having a computer-readable program code embodied therein to be executed by one or more processors, the program code including instructions to:
encode, by an encoder, a plurality of component values into a corresponding plurality of lists of preliminary encoded values, in response to receiving an application log file comprising the plurality of component values;
create a combined list of preliminary encoded values by combining the corresponding plurality of lists of preliminary encoded values;
train an encoder-decoder neural network to encode the combined list of preliminary encoded values into a list of collectively encoded values, to decode the list of collectively encoded values into a list of decoded values, and to optimize a metric that measures a function of the encoder-decoder neural network, in response to receiving the combined list of preliminary encoded values;
encode, by the trained encoder-decoder neural network, a plurality of combined lists of preliminary encoded values into a plurality of lists of collectively encoded values, in response to receiving the plurality of combined lists of preliminary encoded values corresponding to a plurality of application log files; and
enable a detector to detect an application event associated with the plurality of application log files by sending the plurality of lists of collectively encoded values to the detector.

9. The computer program product of claim 8, wherein the plurality of component values comprises a plurality of characters corresponding to a plurality of components associated with the application log file, and the encoder comprises an encoder-decoder neural network.

10. The computer program product of claim 8, wherein the function is selected from at least one of a reconstruction error function, a function that performs a task, and a hybrid function comprising the reconstruction error function and the function that performs the task.

11. The computer program product of claim 10, wherein performing the task comprises encoding an additional combined list of preliminary encoded values into an additional list of collectively encoded values in response to receiving the additional combined list of preliminary encoded values corresponding to an additional application log file, decoding the additional list of collectively encoded values into an additional list of decoded values, and optimizing the metric that measures the function of the encoder-decoder neural network comprises comparing the list of decoded values against the additional list of decoded values.

12. The computer program product of claim 11, wherein training the encoder-decoder neural network comprises an automated selector selecting the application log file and the additional application log file, from a set of application log files, as a training set for the encoder-decoder.

13. The computer program product of claim 8, wherein the preliminary encoded values comprise only numbers and the collectively encoded values comprise only numbers.

14. The computer program product of claim 8, wherein the detector comprises one of a machine-learning system and a statistical model, the plurality of lists of collectively encoded values sent to the detector is associated with a user, and detecting the application event comprises detecting an outlier of the plurality of lists of collectively encoded values associated with the user based on clustering the plurality of lists of collectively encoded values associated with the user.

15. A method for detecting application events based on encoding application log values, the method comprising:
encoding, by an encoder, a plurality of component values into a corresponding plurality of lists of preliminary encoded values, in response to receiving an application log file comprising the plurality of component values;
creating a combined list of preliminary encoded values by combining the corresponding plurality of lists of preliminary encoded values;
training an encoder-decoder neural network to encode the combined list of preliminary encoded values into a list of collectively encoded values, to decode the list of collectively encoded values into a list of decoded values, and to optimize a metric that measures a function of the encoder-decoder neural network, in response to receiving the combined list of preliminary encoded values;
encoding, by the trained encoder-decoder neural network, a plurality of combined lists of preliminary encoded values into a plurality of lists of collectively encoded values, in response to receiving the plurality of combined lists of preliminary encoded values corresponding to a plurality of application log files; and
enabling a detector to detect an application event associated with the plurality of application log files by sending the plurality of lists of collectively encoded values to the detector.

16. The method of claim 15, wherein the plurality of component values comprises a plurality of characters corresponding to a plurality of components associated with the application log file, the preliminary encoded values comprise only numbers, the collectively encoded values comprise only numbers, and the encoder comprises an encoder-decoder neural network.

17. The method of claim 15, wherein the function is selected from at least one of a reconstruction error function, a function that performs a task, and a hybrid function comprising the reconstruction error function and the function that performs the task.

18. The method of claim 17, wherein performing the task comprises encoding an additional combined list of preliminary encoded values into an additional list of collectively encoded values in response to receiving the additional combined list of preliminary encoded values corresponding to an additional application log file, decoding the additional list of collectively encoded values into an additional list of decoded values, and optimizing the metric that measures the function of the encoder-decoder neural network comprises comparing the list of decoded values against the additional list of decoded values.

19. The method of claim 18, wherein training the encoder-decoder neural network comprises an automated selector selecting the application log file and the additional application log file, from a set of application log files, as a training set for the encoder-decoder.

20. The method of claim 15, wherein the detector comprises one of a machine-learning system and a statistical model, the plurality of lists of collectively encoded values sent to the detector is associated with a user, and detecting the application event comprises detecting an outlier of the plurality of lists of collectively encoded values associated with the user based on clustering the plurality of lists of collectively encoded values associated with the user.

* * * * *